UNITED STATES PATENT OFFICE.

AFFONSO DE FIGANIÈRE, OF PHILADELPHIA, PENNSYLVANIA; GIBSON PEACOCK COMMITTEE OF SAID DE FIGANIÈRE (LUNATIC.)

INSULATING AND COATING COMPOUND.

SPECIFICATION forming part of Letters Patent No. 401,014, dated April 9, 1889.

Application filed August 12, 1886. Renewed November 10, 1888. Serial No. 290,478. (No specimens.)

*To all whom it may concern:*

Be it known that I, AFFONSO DE FIGANIÈRE, a citizen of the United States, residing at Philadelphia, in the county of Philadelphia and State of Pennsylvania, have invented certain new and useful Improvements in Insulating and Coating Compounds; and I do declare the following to be a full, clear, and exact description of the invention, such as will enable others skilled in the art to which it appertains to make and use the same.

My invention relates to improvements in compounds for insulating electrical conductors, for lining or coating chemical vessels, wooden battery-jars, reservoirs, tanks, and covers for the storage of mineral and other oils, and other like purposes.

The new product is composed of anthracite or other mineral coal, but preferably of semi-bituminous coal, containing about twenty per cent. of volatile matter, coal-tar pitch distilled at about 520° Fahrenheit, and unslaked lime in the proportions, by weight, of six-fifteenths of semi-bituminous coal, two-fifteenths of unslaked lime, and seven-fifteenths of pitch. A convenient way of combining these substances is to pulverize the coal and lime separately, so that the maximum size of the parts will pass a screen of sixty openings to the square inch, then thoroughly mix them together and then add the pitch, and while stirring slowly melt together in a suitable vessel over a slow fire, so as to avoid injurious evolution of volatile matter from the mixture. Steam under pressure or superheated at a temperature of from 300° to 330° Fahrenheit may be used, if preferred. Indeed, any suitable means of heating may be adopted, care being taken that the heat be not too great. Should it be convenient to mix and prepare the compound at a fixed point before it is needed for use and remelt when the compound is to be used, a slightly greater proportion of pitch should be used than above given to compensate for the evaporation of the volatile matter by reason of the second heating.

It is observed that clay and magnesia, or clay with a proportion of sand, may be mixed with or substituted for the caustic lime before referred to, especially when the product is to be used for lining chemical vessels; but the lime is preferred in all cases.

When anthracite coal is used, sufficient pitch must be taken to supply the volatile matter required in the compound.

I do not confine myself to the exact proportions named, but find that by a substantial adherence thereto the best results are obtained.

The compound resulting from the foregoing composition of matter is electrically and chemically neutral, does not absorb moisture, does not contract while cooling or during crystallization, is not injuriously affected by ordinary changes of temperature, and readily melts or becomes plastic under the action of heat, so that it may be easily worked and applied to use. Moreover, it has the luster, compactness, fine texture, indestructibility, and the general characteristics and appearance of natural bituminous coal.

I claim as my invention—

The hard, fusible insulating and coating composition of matter herein described, consisting of pulverized coal, lime, and coal-tar pitch, in about the proportions specified.

In testimony whereof I affix my signature in presence of two witnesses.

AFFONSO DE FIGANIÈRE.

Witnesses:
 WM. H. LANDELL,
 JAMES A. E. HARTE.